Sept. 20, 1971  A. J. INSERRA  3,606,410
PUSH IN AND PULL OUT LINE UP DOWEL
Filed May 5, 1969
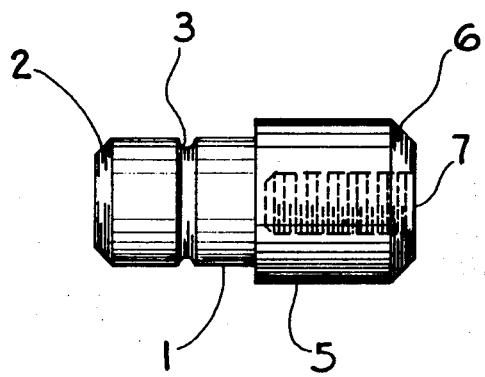
FIG. 1.
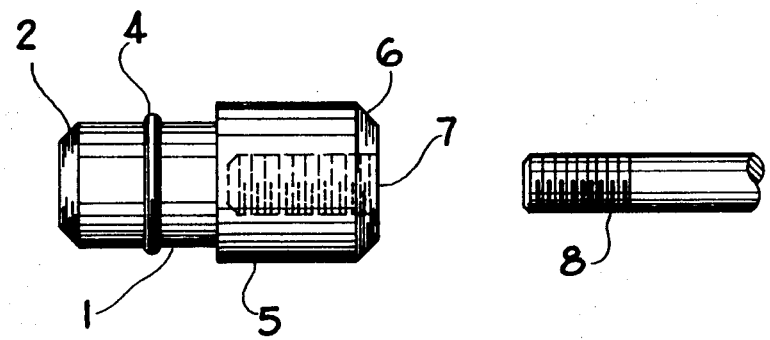
FIG. 2.
FIG. 3.
INVENTOR
ANTHONY J. INSERRA

United States Patent Office 3,606,410
Patented Sept. 20, 1971

---

3,606,410
PUSH IN AND PULL OUT LINE UP DOWEL
Anthony J. Inserra, 26 Center St.,
Jamestown, N.Y. 14701
Filed May 5, 1969, Ser. No. 829,841
Int. Cl. F16b *13/00*
U.S. Cl. 287—127                                          1 Claim

ABSTRACT OF THE DISCLOSURE

A dowel made up of two cylindrical parts integrally connected together, one being of greater diameter than the other, and in the smaller cylindrical part a circular O-ring is disposed in a groove, and an axially threaded hole is formed in the large end. The dowel is suitable for attaching two members together by inserting it in a threaded hole.

---

My invention relates to a device used to position, align, and hold parts while installing and while assembling, especially in the automotive repair, mechanical assembly, and manufacturing fields. To simplify the description, I will refer to this invention as a dowel or dowels.

These dowels can be made of metal, plastics, or other suitable materials. They can be manufactured by machining, casting, or extruding.

In the automotive and other fields, employing mechanical fastenings and assembly procedures alignment and assembly of mating parts often requires, or could be simplified by employing, a dowel to position, align, and hold parts.

My invention could be utilized for these means by manufacturers in their assembly procedures in lieu of permanent pins or dowels permanently located in the mating parts or by mechanics or technicians holding and fastening parts together.

As a rule more than one of these dowels will be needed to position and/or hold a part while installing same. Also, since more than one diameter bolt or bolts may be used to fasten parts, these dowels will be made in the diameters of various bolt hole sizes, and to increase versatility, will be made in various lengths.

The invention will be best understood from a consideration of the following detailed description taken in connection with the accompanying drawings forming a part of the specification, with the understanding, however, that the invention is not confined to a strict conformity with the showing of the drawings, but may be changed or modified so long as the change or modification mark no material departure from the salient features of the invention, as expressed in the appended claim.

FIG. 1 and FIG. 2 are side views of the dowel. FIG. 3 is a side view of the threaded rod or bolt used to remove the dowel.

As you refer to FIGS. 1 and 2, please note that the lower portion of the dowel 1 is to be of the proper diameter to fit into the threaded bolt hole or holes, of one of the mating parts and is chamfered 2, rounded, or beveled to more easily slide into the threaded hole. It is grooved 3 to accept an O-ring 4 made of rubber or other suitable material, for purposes of firmly holding the dowel in the bolt hole and makes it possible to utilize the same dowel in coarsely and finely threaded bolt holes.

The upper portion of the dowel 5 is of the proper diameter to fit into the bolt holes in the other mating part, and is chamfered 6, rounded, or beveled to allow the part to be guided over the dowel or dowels. The dowel is drilled and tapped 7 to accept a threaded rod or bolt 8 for use in removing the dowel once the part has been positioned and partially installed.

To use these dowels, push one or more into the threaded bolt holes of one of the parts to be joined, position the adjoining part by sliding over the dowels and install bolts into the unused holes in the mating parts. Remove the dowels by using a threaded rod or bolt or if the guide portion 5 is of sufficient length, grasp and remove with fingers or suitable tool and install bolts in the remaining holes in the adjoining parts.

Having described my invention, my claims are as follows:

1. A dowel and inserting bolt,
said dowel being adapted to be inserted in a threaded hole to hold two mating parts together comprising,
    a lower cylindrical portion and an upper cylindrical portion,
    said upper cylindrical portion being of greater diameter than said lower cylindrical portion and terminating adjacent said lower cylindrical portion in a shoulder,
    said upper cylindrical portion being integrally attached to said lower cylindrical portion and defining a head thereon,
    the end of said lower cylindrical portion remote from said upper cylindrical portion being chamfered,
    the end of said upper cylindrical portion remote from said lower cylindrical portion being chamfered,
    a peripheral groove in said lower cylindrical portion approximately half way between said chamfer on said lower cylindrical portion and said upper cylindrical portion,
    a round O-ring in said groove,
    and an axially disposed threaded hole in said upper cylindrical portion and a bolt having threaded end adapted to be inserted in said axially disposed hole.

References Cited

UNITED STATES PATENTS

| 1,508,026 | 9/1924 | Noble | 287—126UX |
| 2,708,781 | 5/1955 | McMullan | 287—20.92EX |
| 2,869,883 | 1/1959 | Dunbar | 287—126X |

FOREIGN PATENTS

| 688,480 | 6/1964 | Canada | 287—20.92E |
| 1,186,691 | 2/1965 | Germany | 287—126 |

DAVID J. WILLIAMOWSKY, Primary Examiner

A. V. KUNDRAT, Assistant Examiner